(12) United States Patent
Nahmias et al.

(10) Patent No.: US 6,469,101 B2
(45) Date of Patent: Oct. 22, 2002

(54) VULCANIZABLE RUBBER COMPOSITION FOR TREADS OF VEHICLE TIRES

(75) Inventors: Marco Nahmias; Pierluigi De Cancellis, both of Milan (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 09/942,918

(22) Filed: Aug. 31, 2001

(65) Prior Publication Data

US 2002/0019484 A1 Feb. 14, 2002

Related U.S. Application Data

(62) Division of application No. 09/292,324, filed on Apr. 15, 1999, now Pat. No. 6,291,588, which is a continuation of application No. 08/679,677, filed on Jul. 12, 1996, now abandoned.

(30) Foreign Application Priority Data

Jul. 14, 1995 (IT) .......................................... MI95A1516

(51) Int. Cl.⁷ .................................................. C08F 8/30
(52) U.S. Cl. ........................ 525/132; 525/185; 525/384; 525/385; 525/390; 152/450; 152/452
(58) Field of Search .................................. 525/132, 185, 525/384, 385, 390; 152/450, 452

(56) References Cited

U.S. PATENT DOCUMENTS

| | | | |
|---|---|---|---|
| 4,283,503 A | 8/1981 | Wright | |
| 4,334,044 A | 6/1982 | Kotani | |
| 4,487,892 A | 12/1984 | Ohmori et al. | |
| 4,910,241 A | 3/1990 | Abolins et al. | |
| 5,162,409 A | 11/1992 | Mroczowski | |
| 5,418,275 A | 5/1995 | Okada et al. | |

FOREIGN PATENT DOCUMENTS

| | | |
|---|---|---|
| EP | 117834 | 2/1984 |
| EP | 351054 | 9/1989 |
| EP | 470693 | 11/1991 |
| FR | 2524472 | 3/1983 |

OTHER PUBLICATIONS

Database WPI Abstract JP–A–04 249 551 (Sumitomo Chem).
Database WPI Abstract JP–A–60 197 751 (Toyo Rubber) 10/85.

*Primary Examiner*—Bernard Lipman
(74) *Attorney, Agent, or Firm*—Stevens, Davis, Miller & Mosher, LLP

(57) ABSTRACT

A vulcanizable rubber composition is described comprising a cross-linkable unsaturated chain polymeric base, wherein is incorporated at least one organic compound, solid at room temperature, selected from the group comprising: amorphous or semicrystalline polymers, oligomers, low-molecular weight organic substances and mixtures thereof, which compound is substantially insoluble in the polymeric base and shows a first or second order transition temperature of from 80 to 160° C. Such rubber composition allows the manufacture of treads with either a low rolling resistance at the temperature of normal use of the tire (40°–70° C.), or a high grip when the tread is subjected to thermal stresses exceeding such temperatures.

31 Claims, 2 Drawing Sheets

VULCANIZABLE RUBBER COMPOSITION FOR TREADS OF VEHICLE TIRES

This is a divisional of U.S. patent application Ser. No. 09/292,324, filed Apr. 15, 1999, now U.S. Pat. No. 6,291,588, of U.S. patent applicatin Ser. No. 08/679,677, filed Jul. 12, 1996, abandoned, incorporated herein by reference.

FIELD OF THE INVENTION

The present invention relates to a vulcanizable rubber composition of the type comprising a cross-linkable unsaturated chain polymeric base, which has a preferred, while not exclusive, use in the manufacture of treads for vehicle tires.

The invention also relates to a tread and a tire obtainable by the above composition.

BACKGROUND OF THE INVENTION

In the following description and in the subsequent claims, the terms: cross-linkable unsaturated chain polymeric base, are used to indicate any non cross-linked polymer, either natural or synthetic, capable of assuming all the physico-chemical and mechanical characteristics typical of elastomers as a result of cross-linking (vulcanization).

As is known, in the manufacture of vehicle tires and, more particularly, of tires having very high performances, one of the more difficult problems to solve has always been that of achieving either a low rolling resistance at the temperatures of normal use of the tire (40–70° C.), or an adequate road holding (grip) when the tire exceeds said temperatures as a result of high thermo-mechanical stresses, such as, for instance, those ensuing from a so-called "borderline" use of said tire.

It is also known that the difficulty of simultaneously achieving these desired characteristics essentially stems from the fact that they are affected in a completely opposite manner by the hysteretic characteristics, i.e. by the amount of dissipated energy, of the rubber composition that constitutes the tire tread.

In order to achieve the desired low rolling resistance of the tire, in fact, it is necessary to use rubber compositions with a low hysteresis value, and as such suitable to dissipate limited energy amounts during rolling.

On the other hand, in order to achieve the desired high road grip, it is necessary to use rubber compositions having a high hysteresis value, and as such suitable to dissipate energy amounts apt to ensure a high grip between the tread and the ground.

The solution to this problem is even more difficult if it is considered that the rubber composition constituting the tire tread should possess hysteretic behaviours quite opposite and incompatible with one another, depending upon the working temperature range of the tire.

All the attempts made in the art to improve tire performances within a temperature range above those normally used, in fact, have met either a marked and undesired increase in rolling resistance, or a substantial worsening of the abrasion resistance characteristics of the tread.

These disappointing attempts were substantially based on the use in the rubber composition of hydrocarbon resins substantially soluble in the SBR-containing polymeric bases tipically used in the production of treads for vehicle tires, such as for example alpha-methylstyrene-derived resins (such as the resin marketed under the trade name KRISTALEX™ F-85, produced by Hercules, Wilmington, Del. U.S.A.) or coumarone-based resins.

The ensuing practical consequence is that the above problem has not been solved yet in the art.

SUMMARY OF THE INVENTION

As a consequence, the technical problem underlying the present invention is that of providing a rubber composition having a different hysteretic behaviour depending upon the working temperature of the tire, so as to obtain either a low rolling resistance at the temperatures of normal use of the tire (40–70° C.), or an adequate road holding (grip) when the tire exceeds said temperatures as a result of high thermo-mechanical stresses.

According to the present invention, it has surprisingly been found that the desired low rolling resistances at the above working temperatures of the tire and high grip in borderline working conditions of the same, may be simultaneously achieved provided that at least one organic compound, solid at room temperature, is incorporated in the polymeric base of the rubber composition used to manufacture the tread, which compound:

a) should be substantially insoluble in said polymeric base; and b) should have a first or second order transition temperature of from 80 to 160° C.

Preferably, said organic compound is selected from the group comprising: amorphous or semicrystalline polymers, oligomers, low-molecular weight organic substances and mixtures thereof.

Preferably, the polymers of the invention have an average numeric molecular weight of from 10,000 to 1,000,000.

For the purposes of the invention, polymers of preferred and advantageous use are those selected from the group comprising: polyphenylenether, polyethylene, polypropylene, polymethyl-methacrylate, polystyrene, polyvinylalcohol, ethylene/vinyl alcohol copolymers, acrylonitrile-butadiene-styrene (ABS) terpolymers, ethylene-methacrylic acid copolymers, styrene-isoprene (SIS), styrene-butadiene (SBS), styrene-ethylene/butylene-styrene (S-E/B-S), and styrene-ethylene/propylene (S-E/P) block copolymers and mixtures thereof.

Optimum results have been achieved with polyphenylenether having a glass transition temperature of 120° C., marketed by Hüls under the trade name VESTORAN™ 1100.

Preferably, the oligomers of the invention have an average numeric molecular weight of less than 10,000, and more preferably of from 500 to 10,000.

For the purposes of the invention, oligomers of preferred and advantageous use are those selected from the group comprising aliphatic or aromatic hydrocarbon resins having an average numeric molecular weight comprised in the above-defined range.

Optimum results have been achieved either with the aliphatic hydrocarbon resins marketed by Hercules under the trade name PICCOPALE™ 100 and PICCOTAC™ 95, or with the aromatic hydrocarbon resin marketed by Hercules under the trade name ENDEX™ 155.

For the purposes of the invention, the aforementioned low-molecular weight organic substances have a molecular weight of up to about 300 and are preferably selected from the group comprising: aromatic and aliphatic hydrocarbons, phenols, alkyl halides, aldehydes, quinones, anhydrides, organic acids, amides, and mixtures thereof.

Among them, the following are preferred: phenanthrene, catechol, resorcinol, iodoform, carbon tetrabromide, m-oxybenzaldehyde, p-nitrobenzaldehyde, p-benzoquinone, succinic anhydride, azelaic acid, caproamide, valeramide, benzamide, and mixtures thereof.

DETAILED DESCRIPTION OF THE PREFERRED EMBODIMENTS

Figure 1:
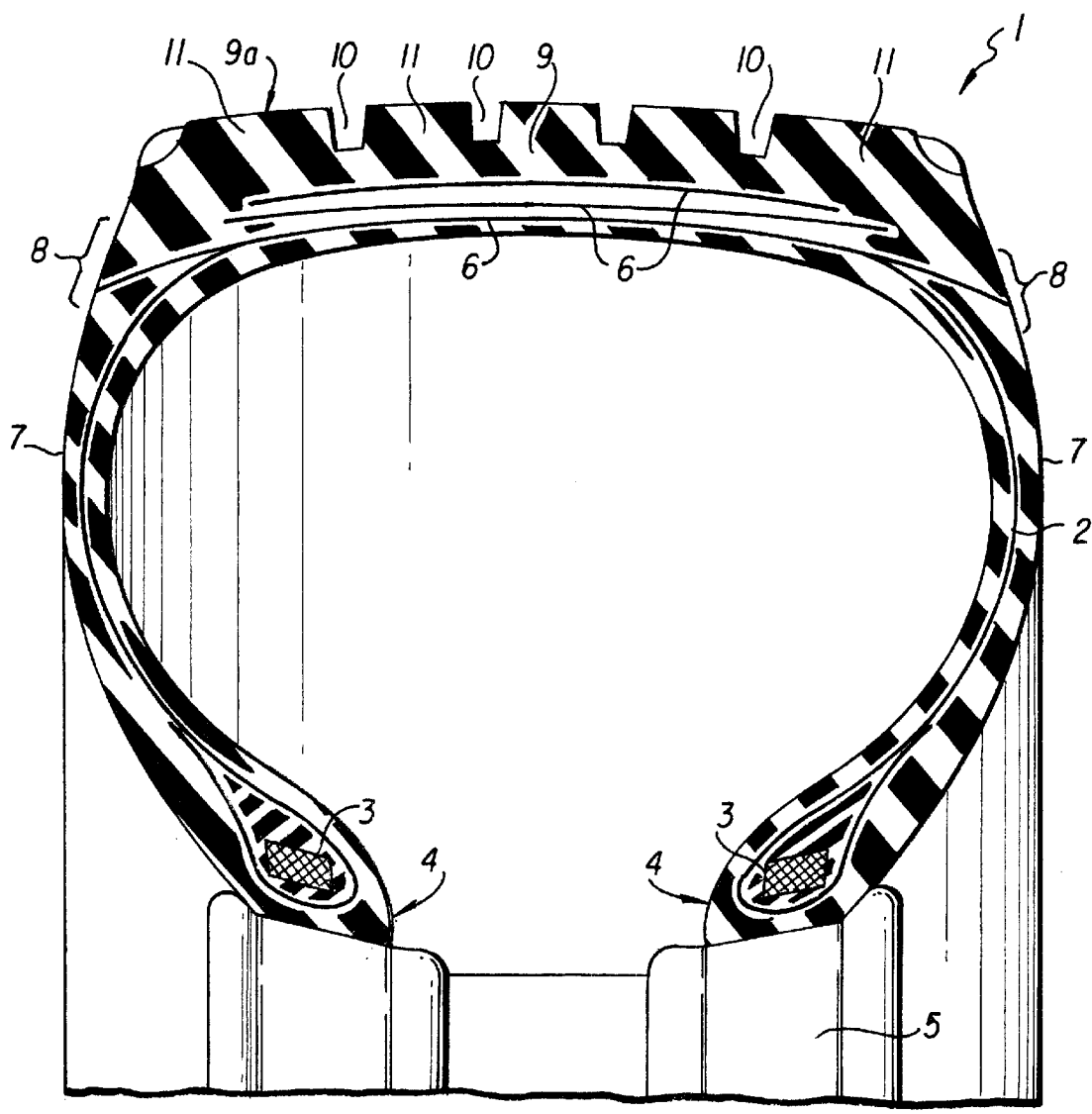
FIG. 1 shows a partly interrupted cross section of a tire of the present invention.

In the following description and in the appended claims, the term: first order transition temperature, is used to indicate the temperature at which the thermodynamic state functions such as, for instance, enthalpy, entropy or volume, show a point of discontinuity, i.e. a sudden change as temperature varies.

In the case of the semicrystalline polymers of the invention, such temperature corresponds to the disgregation of the crystalline domains existing in the polymer matrix (melting) and takes place within a more or less wide range of values. This is due to the non uniform regularity degree of the crystalline domains or to the presence of defects of variable nature and extent within the same.

The amorphous polymers of the invention do not show this type of transition.

In the following description and in the subsequent claims, the term: second order transition temperature, or glass transition temperature ($T_g$) is used to indicate the temperature that separates the hard and brittle (glass) state from the rubbery state of the polymer, i.e., the temperature above which the macromolecular chains of the polymer are capable of deforming, changing their conformation through heat-activated jumps, and under which the movement of the various segments of such macromolecular chains is substantially barred (see M. Rink, "The polymers: structure and technological implications", Proceedings of XVII Meeting AIM School, Polymeric Materials: Structure and Processability, Gargnano, 1995).

Both the semicrystalline polymers (limitedly to the amorphous part) and the amorphous polymers of the invention show this type of transition.

In the following description and in the subsequent claims, the expression: organic compound substantially insoluble in a given polymeric base, is used to indicate a compound such that the tgδ curve as a function of temperature of the vulcanized rubber composition, as determined by means of experimental techniques known per se, for instance by using the commercially available equipments of Rheometrics with a temperature sweep from −120° C. to +140° C., shows a peak in correspondence of each first or second order transition temperature of said polymeric base and, respectively, of said compound.

In this case, in fact, the above compound even if it is incorporated in the mass of the polymeric base, it does not dissolve in the latter, but forms, instead, a number of "islands" in said mass which retain the physico-chemical and viscoelastic (hysteretic) characteristics of the solid compound.

It has been found that when the compound added to the polymeric base shows the combination of features mentioned hereinabove, the resulting rubber composition allows to obtain a tread with a low rolling resistance at the temperatures of normal use of the tire (40–70° C.) and, at the same time, a high grip when the tread temperature exceeds such values as a result of thermo-mechanical stresses to which it is submitted.

In particular, with the rubber compositions of the invention it has been observed, after vulcanization, a variation in the tread hysteresis values along with the temperature increase and above a threshold value near the transition temperature of the above compound.

Near this threshold value, the energy dissipation due to tread hysteresis undergoes a sudden increase and reaches values suitable to ensure an adequate road holding (grip) of the tire.

The tests carried out have also showed that the higher the tread temperature, the more marked is the phenomenon of energy dissipation, with a corresponding advantageous frictional grip increase just when the tire works at its borderline conditions.

According to a further advantageous aspect of the invention, the temperature at which a variation in the hysteresis values of the vulcanized rubber composition begins to appear, may be determined in advance, depending upon the selected polymeric base, by selecting a rubber composition having the desired transition temperature.

According to the tests carried out, in fact, the increase in energy dissipation due to hysteresis begins to show, in the case of the compounds considered, in the vicinity of the first or second order transition temperature of the same.

Vice versa, when the rubber composition of the tread does not undergo high termo-mechanical stresses and works at a temperature of 40–70° C., energy dissipation by hysteresis is substantially determined by, the "polymeric base" component of the rubber composition itself.

In other words, it has been observed that within such temperature range the compounds of the invention do not appreciably affect the hysteretic behaviour of the vulcanized rubber composition.

As a consequence, by appropriately selecting the ingredients of the rubber composition, it is possible to achieve either a low rolling resistance at the temperature of normal use of the tire, or a high grip when its working temperature increases.

According to the invention, improved characteristics of mechanical resistance of tire tread, such as for instance strength at break, abrasion resistance and tear resistance, have been obtained when the above compound solid at room temperature is also substantially compatible with the above polymeric base of the rubber composition.

The expression: compound substantially compatible with a given polymeric base, is used to indicate in the following a compound such that the abradability of the vulcanized rubber composition, determined according to the DIN 53516 standards, does not exceed 120% of the abradability value— measured in the same test conditions—of the same composition without said at least one compound.

In such a case, in fact, the above compound, though being insoluble in the mass of the polymeric base, may anyway disperse homogeneously in the latter and establish with the molecules of the polymeric base physico-chemical bonds which keep anyhow unaltered the mechanical characteristics and the abradability of the rubber composition.

Within the framework of the invention, therefore, a compound may be defined as compatible with a given polymeric base if it does not induce in the rubber composition the typical effects of an inert filler, such as for instance a marked worsening of the abradability characteristics of the same.

Among the polymeric bases useful for the purposes of the invention, those preferred are unsaturated chain polymers or copolymers obtained by polymerization of conjugated dienes and/or aliphatic or aromatic vinyl or vinylidenic monomers.

More particularly, the polymeric bases of the invention may be selected from the group comprising: natural rubber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylene-propylene-diene terpolymers.

According to the invention, such polymeric bases may be used either individually or mixed with one another, according to the desired characteristics of the finished product.

Preferably, the polymeric bases of the invention comprise from 20 to 100% by weight of a styrene-butadiene copolymer.

According to the invention, it is particularly advantageous to incorporate in the rubber composition from 2 to 30 parts by weight, preferably from 5 to 15 parts by weight, of the above high-transition temperature compound per each 100 parts by weight of polymeric base.

When the rubber composition comprises such a quantity of compound, in fact, the treads obtainable therefrom have given excellent results in terms of low rolling resistance at the temperatures of normal use of the tire (40–70° C.) and of high grip when the tire is brought to borderline use conditions.

It has also been found that when the quantity of compound is under 2 parts by weight per each 100 parts of polymeric base, its effect on the hysteresis values of the rubber composition at high temperature is reduced, while above 30 parts by weight the beneficial effects on the grip of the tire are more than counterbalanced by the worsening of the mechanical characteristics of the tread.

As to the lower limit of the transition temperature of the compounds of the invention, it has been noticed that when such temperature is under about 80° C., an undesired increase in tread rolling resistance is found.

As to the upper limit of 160° C. of the transition temperature of the compounds of the invention, higher temperature values do not seem to provide, on the contrary, substantial benefits in the case of treads of normal use in vehicle tires, since such temperature value is unlikely to be reached even in the most extreme conditions of use.

In any case, the choice of the compound with the most suitable transition temperature may be effected by a man skilled in the art according to the type of vehicle on which the tire must be mounted.

According to a preferred embodiment and for the purpose of having a low rolling resistance at the temperatures of normal use of the tire (40–70° C.), the rubber compositions of the invention are of the so-called low carbon black content type, in which the latter is partly or entirely replaced by so-called "white" inorganic reinforcing fillers, such as gypsum, kaolin, bentonite, titanium dioxide, silicates of various type and silica.

In a preferred embodiment, the rubber compositions of the invention incorporate at least a silica-based reinforcing filler and a suitable binding agent capable of chemically reacting with silica and of binding the latter to the polymeric base during the vulcanization of the same.

In the following description and in the subsequent claims, the term: silica-based reinforcing filler, is used to indicate a reinforcing agent based on silicon dioxide (silica), silicates and mixtures thereof, having a surface area, measured according to the BET method, of from 100 to 300 m$^2$/g.

To the sole purpose of simplifying this description, the silica-based fillers of the invention will be indicated in the following by the term: silica.

According to the invention, it is particularly advantageous to incorporate in the rubber composition from 10 to 80 parts by weight of silica per each 100 parts by weight of polymeric base.

When the rubber composition incorporates such a quantity of silica, in fact, optimum results have been reached in tires obtainable therefrom, in terms either of mechanical characteristics, or of reduction in the rolling resistance.

According to a preferred embodiment of the invention, the rubber composition incorporates one or more non cross-linking ingredients, known per se, necessary to impart to the rubber composition the necessary mechanical and workability characteristics.

Such ingredients are selected in particular from the group comprising reinforcing fillers, such as for instance carbon black, plasticizers, working adjuvants, antioxidants, age-retarding agents, etc.

Each of such ingredients is also chosen in amounts and proportions which may be easily determined by those skilled in the art.

The rubber composition, furthermore, is made vulcanizable by adding and incorporating therein a suitable vulcanizing agent, optionally and preferably together with suitable vulcanization activators and accelerators.

If the polymeric base is selected from the preferred cross-linkable unsaturated chain polymers, the vulcanizing agent of most advantageous use is sulphur, or sulphur-containing molecules (sulphur donors), with accelerators and activators well known to those skilled in the art.

Among vulcanization activators, zinc stearate, formed directly in the rubber composition by adding zinc oxide and stearic acid, is preferred.

By way of non-limitative illustration, there is specified in the following a preferred recipe of a rubber composition according to the invention (in parts by weight):

| | |
|---|---|
| polymeric base | 100 |
| high-transition temperature compound | 5–15 |
| carbon black | 0–80 |
| silica | 0–80 |
| ZnO | 1–5 |
| Stearic acid | 0–5 |
| antioxidants | 1–3 |
| anti-fatigue agents | 0.5–3 |
| sulphur or donors of same | 0.5–3 |
| accelerators | 0.5–3 |
| plasticizers | 0–40 |

The above-identified rubber composition may be obtained by means of mixing operations conventional per se and well known to those skilled in the art, which will not be described in detail.

According to a further aspect of the invention, a tread is provided with a low rolling resistance at the temperatures of normal use of tire (40–70° C.), and a high road holding (grip) when the tire exceeds such temperatures as a result of high thermo-mechanical stresses, obtainable by forming a vulcanizable rubber composition of the type described hereinabove.

Preferably, the tread of the invention is formed by drawing, moulding or calendering at a temperature of from 80 to 120° C.

Advantageously, the tread—once vulcanized with operations known per se—shows an increase in energy dissipation by hysteresis and, as a result, in the road holding of the tire above a threshold temperature proximate to the transition temperature of the high transition temperature organic compound of the invention.

Thanks to the compatibility of said compound with the polymeric base of the rubber composition, furthermore, the tread of the invention advantageously shows an abradability value, measured according to DIN 53516, not greater than 120% of the abradability value of a tread of the same composition without said compound.

According to a further aspect of the invention, a process is provided for the manufacture of tires for vehicle wheels, comprising the steps of providing around the circumference of a carcass a tread externally provided with a rolling surface, and linking by vulcanization said carcass to said tread, which is characterized in that said tread is obtained by forming a vulcanizable rubber composition of the type described hereinabove.

According to a further aspect, the invention also refers to a tire for vehicle wheels whose tread shows an increase in energy dissipation by hysteresis and, as a result, in road holding as the temperature increases and starting from temperature values proximate to the transition temperature of the aforementioned compound and in every so-called borderline use conditions.

Quite surprisingly, tires manufactured according to the process of the invention, when subjected to road tests and compared with tires fully identical but incorporating a tread manufactured according to the prior art, have given much better results, as will be seen in the following.

Therefore, according to yet a further aspect, the invention concerns a process for improving tire behaviour on road, which is characterized in that the tire tread is obtained by forming a vulcanizable rubber composition of the type described hereinabove.

Further characteristics and advantages will be better apparent by the following description of some examples of vulcanizable rubber compositions, tread and tires according to the invention, given by way of non-limitative illustration, with reference to the attached drawings.

Figure 2:
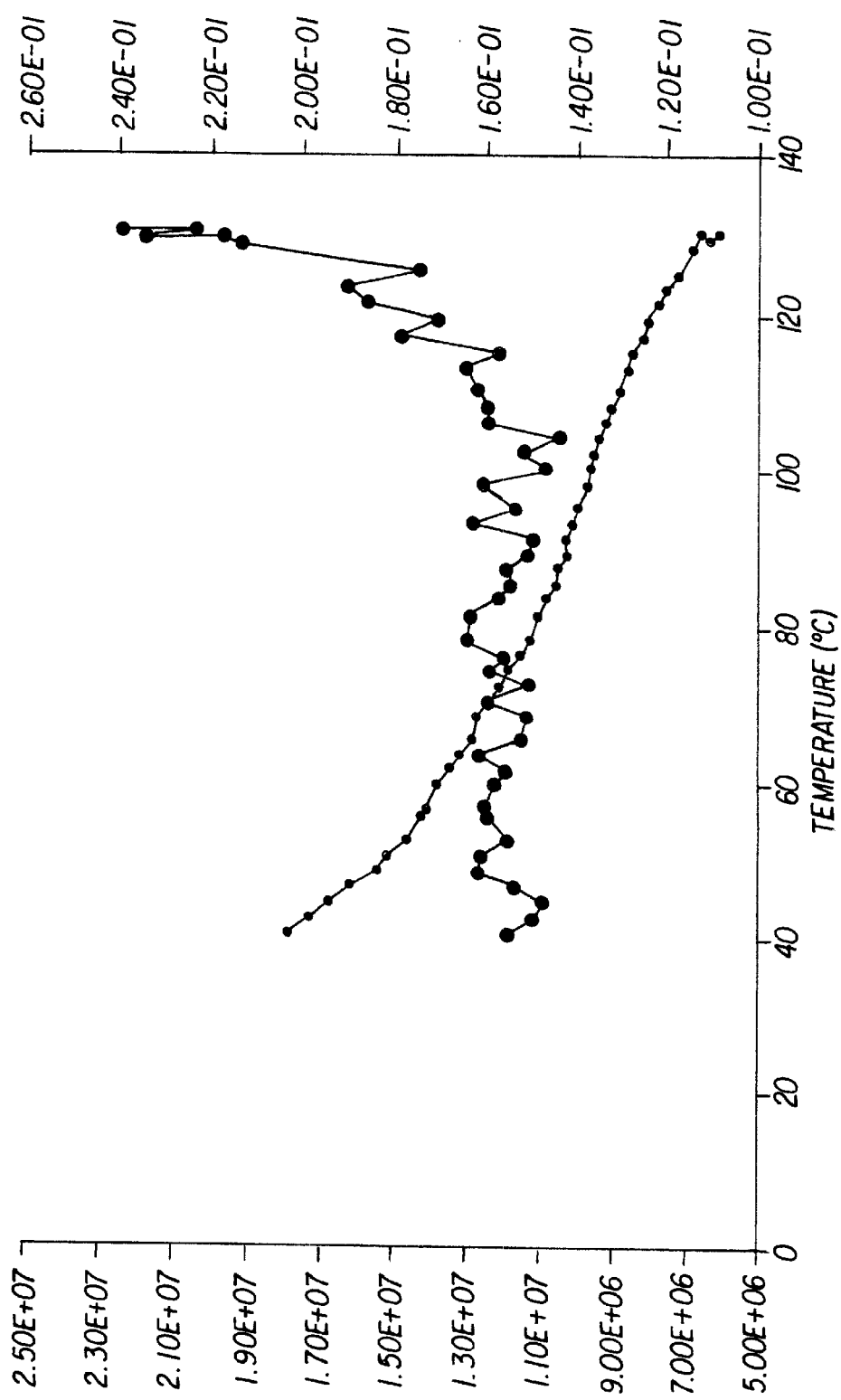
FIG. 2 shows the values of tgδ and modulus of elasticity G' as a function of the temperature of a preferred rubber composition of the invention.

In the drawings:

FIG. 1 shows a partly interrupted cross section of a tire according to the invention;

FIG. 2 shows the values of tgδ and modulus of elasticity G' as a function of the temperature of a preferred rubber composition according to the invention.

With reference to FIG. 1, a tire 1 conventionally comprises at least a carcass ply 2 whose opposite side edges are externally bent around bead wires 3, incorporated each in a bead 4, defined along an internal circumferential edge of the tire where the tire itself engages on a wheel rim 5 making part of the wheel of a vehicle.

Along the circumferential development of the carcass ply 2, one or more belt strips 6, made of textile or metal cords incorporated into a rubber composition sheet, are applied.

Externally to the carcass ply 2, in respective opposed side portions thereof, a couple of sidewalls 7 is applied, each of which extends from the bead 4 up to a so-called "shoulder" 8 of the tire, defined in correspondence of opposite ends of the belt strips 6.

Onto the belt strips 6 a tread 9 is circumferentially applied whose side edges end in correspondence of the shoulders 8 joining with the sidewalls 7. The tread 9 has an external rolling surface 9a, designed to contact the ground, wherein circumferential grooves 10 may be obtained, intercalated by transversal grooves, not shown in the attached figure, which define a plurality of tread blocks 11 variously distributed along said rolling surface 9a.

The above described tire 1 may be manufactured by means of a process including a plurality of production steps which are quite conventional per se and known in the art.

More particularly, such process comprises the steps of preliminarly and independently preparing several semi-finished products corresponding to the different parts of the tire (carcass plies, belt strips, bead wires, fillings, sidewalls and treads), which are subsequently assembled to one another by a suitable assembling machine.

The subsequent vulcanization step then welds together the above semi-finished products to form a monolithic block, i.e. the tire.

Clearly, the step of preparing the above semi-finished products is preceded by a step of preparing and forming the corresponding rubber compositions.

In the tires of the invention, the tread 9 is produced by forming a vulcanizable rubber composition of the type described hereinabove.

EXAMPLE 1

In a closed rotor mixer (Banbury) model F270 of the company POMINI, which had been caused to rotate at a speed of about 40 rpm, the following ingredients were charged in sequence:

E-SBR=butadiene-styrene copolymer prepared in emulsion, having a styrene content of 23%;

polyphenylenether=VESTORAN 1100 (Hüls);

carbon black=N115 type (Cabot Corporation);

silica=BET 175 $m^2/g$, VN3 type (Degussa);

silane-based binder=Si69 [bis(2-triethoxysilyl-propyl) tetrasulfide] (Degussa);

age-retarding agent=6PPD, also known as SANTOFLEX 13 (Monsanto);

anti-fatigue agent=TMQ, also known as VULCANOX 4020 (Bayer), as well as other commonly used ingredients in smaller amounts.

The rubber composition obtained was charged, after cooling down to room temperature, in a closed rotor mixer (Banbury) model 11D of the company POMINI, which had been caused to rotate at a speed of about 20 rpm, together with the following ingredients:

sulphur;

vulcanization accelerators [diphenylguanidine DPG (Monsanto) and SANTOCURE NS (Monsanto)].

The rubber composition was then submitted to intimate mixing, so as to disperse the vulcanizing system, taking care to keep the temperature of the composition at a value equal to about 100° C., so as not to initiate undesired phenomena of premature vulcanization.

After about 3', 170 kg of a vulcanizable rubber composition were discharged, comprising in parts by weight:

| | |
|---|---|
| polymeric base | 100 |
| polyphenylenether | 8 |
| carbon black | 35 |
| silica | 30 |
| binding agent | 8% of silica |
| ZnO | 2 |
| stearic acid | 1 |
| antioxidants | 2.5 |
| antifatigue agents | 1 |
| plasticizers | 15 |
| sulphur | 1.2 |
| accelerators | 2.5 |

EXAMPLES 2–5

According to the procedure described in the preceding Example 1, rubber compositions were prepared having the compositions shown in Table 1 herunder.

TABLE I

| Ingredients | Ex. 2 | Ex. 3 | Ex. 4 | Ex. 5 |
|---|---|---|---|---|
| S-SBR | 100 | — | — | 75 |
| E-SBR | — | 75 | 75 | — |
| NR | — | 25 | — | — |
| BR | — | — | 25 | 25 |
| carbon black | 20 | 50 | 70 | 20 |
| cpds. of inv. | 15 | 5 | 7 | 10 |
| silica | 50 | 15 | — | 50 |
| binding agent | 5 | 1.5 | — | 5 |
| ZnO | 2 | 2 | 2 | 2 |
| Stearic acid | 1 | 1 | 1 | 1 |
| antioxidants | 2.5 | 2.5 | 2.5 | 2.5 |
| sulfur | 1.5 | 1.5 | 1.5 | 1.5 |
| accelerators | 2 | 2 | 2 | 2 |

S-SBR = butadiene-styrene copolymer prepared in solution, having a content of styrene of 26%, a content of 1,4-trans bonds of 26% and of vinyl groups of 60%;
NR = natural rubber;
BR = polybutadiene having a content of 1,4-cis bonds equal to 93%.
The compounds of the invention used were the following:
Ex. 2 = S-E/B-S block copolymer, commercially available under the trade name KRATON ™ G-1651 (Shell);
Ex. 3 = ethylene-methacrylic acid copolymer (8.7%), commercially available under the trade name NUCREL ™ 0910 (E. I. Du Pont De Nemours);
Ex. 4 = polyphenylenether, commercially available under the trade name VESTORAN ™ 1100 (Huls);
Ex. 5 = polyethylene, commercially available under the trade name RIBLENE ™ MR10 (Enichem).
Other ingredients: as in Example 1.

EXAMPLE 6

Determination of the hysteretic properties of the rubber composition

A sample of the rubber composition according to the preceding Example 1 was submitted to vulcanization with methods and apparatuses known per se, and then to several tests to evaluate its hysteretic properties as a function of the temperature.

More particularly, the values of tanδ, defined as:

$$\tan\delta = G''/G'$$

wherein:
G": modulus of loss [MPa]
G': modulus of elasticity [MPa]
and of the modulus of elasticity G', were determined in a range of from 40° to 130° C., with experimental methods known per se and using apparatuses marketed by the Company Rheometrics.

The tests were carried out on strip-shaped test samples having a width of 12±0.2 mm, a thickness of 2±0.2 mm and a length of 40 mm (working length 24 mm), which were torsion stressed with an amplitude equal to 0.1% and a frequency of 1 Hz by means of a rheometer model "Rheometer R.D.A. 700" (Rheometrics), commonly available on the market.

The end temperature of 130° C. was reached by submitting the test sample to a temperature sweep at a heating speed equal to about 2° C. per minute.

The results of the tests carried out are graphically shown in the attached FIG. 2, wherein the average values out of 8 tests of the modulus of elasticity G' (MPa) and, respectively, of tgδ (dimensionless), are shown on the ordinates, while the temperature (°C.) is shown on the abscissa.

As may be easily appreciated from the figure, while the modulus of elasticity G' progressively decreases as the temperature increases, the value of tgδ, proportional to the energy dissipation by hysteresis of the rubber composition, remains substantially constant from 40 to 100° C., and has a sudden increase starting from about 100° C., near the glass transition temperature of the polyphenylenether included in said composition.

As a result, the aforementioned rubber composition undergoes a drastic increase in its energy dissipation by hysteresis and, along therewith, in the tread grip, just in correspondence of the temperature range which is reached by the tread when the same is subjected to severe thermomechanical stresses (borderline conditions).

Therefore, in such conditions, the tread exerts such a high frictional grip on the ground which is indispensable for a good road holding of the tire.

EXAMPLE 7

Determination of the abradability characteristics of the rubber composition

A sample of the rubber composition according to the preceding Example 1 was submitted to vulcanization with methods and apparatuses known per se, and then to several tests to evaluate its abradability characteristics.

Such parameter was assumed, in first approximation, as proportional to the compatibility degree between the high transition temperature polymer and the polymeric base of the rubber composition.

The tests were carried out according to the DIN 53516 standard, both on the vulcanized rubber composition incorporating polyphenylenether of the preceding Example 1, and on a vulcanized rubber composition of the same composition but without, polyphenylenether (comparison composition).

In the abradability test, 129 mm³ of material of the comparison vulcanized rubber composition and 140 mm³ of the vulcanized rubber composition of the invention were removed, with an increase in abradability equal to about 8% (i.e., with an abradability value equal to about 108% of that of the comparison composition), well suitable to satisfy the abradability requisites required to a tread for vehicle tires.

EXAMPLE 8

Road behaviour

With the rubber compositions obtained according to the preceding Example 1, several treads were produced by drawing in conventional apparatuses, which treads were then assembled on to 235/40–18 size tires.

The tires so obtained were then submitted to several standard tests—carried out at the Imola racing track on BMW cars model M5—to evaluate their road behaviour in borderline use condition ("Hard Handling").

In all the tests performed, the tires incorporating treads manufactured with the rubber composition of the preceding Example 1, were evaluated taking as a reference the tires manufactured with a rubber composition of the same composition but without polyphenylenether (comparison tires).

At the end of the test, a rate from 0 to 10 was assigned by the test driver to each of the evaluation parameters examined.

Table II shows the results so obtained, expressed as average values of the evaluations made by two different tests drivers.

TABLE II

| Parameters | Ex. 1 | comparison |
|---|---|---|
| effort at steering wheel | 6 | 5 |
| gearing promptness | 6 | 4 |
| balance* | 5 | 4 |
| compliance | 6 | 4 |
| curve release | 6 | 4 |
| handling | 6 | 4 |

*= both oversteering and understeering

As may be observed from the table reported hereinabove, the tires of the invention performed markedly better with respect to the tires manufactured according to the prior art.

More particularly, not only a marked improvement of road holding in the test borderline conditions was observed, but also an increase of the resistance to stresses over time, which in the case of the tires of the invention was equal to about six times that provided by the comparison tires.

What is claimed is:

1. A vulcanizable rubber composition comprising:
   a. cross-linkable unsaturated chain polymeric base, and
   b. from 2 to 30 parts by weight of the polymeric base of at least one polymeric organic compound solid at room temperature and having a glass transition temperature of from 80 to 160° C. and an average molecular weight of from 10,000 to 1,000,000, said polymeric organic compound being substantially insoluble in said polymeric base,
   wherein the rubber composition has, once vulcanized, a first hysteretic behavior at a first working temperature of a tire having a thread made of the composition and a second hysteretic behavior, which differs from the first hysteretic behavior, at a second working temperature of the tire.

2. A vulcanizable rubber composition according to claim 1, characterized in that said at least one organic compound is selected from the group comprising: amorphous or semicrystalline polymers, oligomers, low-molecular weight organic substances and mixtures thereof.

3. A vulcanizable rubber composition according to claim 1, wherein said at least one polymeric organic compound is a polymer selected from the group consisting of polyphenylenether, polyethylene, polypropylene, polymethyl-methacrylate, polystyrene, polyvinylalcohol, ethylene/vinyl alcohol copolymers, acrylonitryle-butadiene-styrene (ABS) terpolymers, ethylene-methacrylic acid copolymers, styrene-isoprene (SIS), styrene-butadiene (SBS), styrene-ethylene/butylene-styrene (S-E/B-S), and styrene-ethylene/propylene (S-E/P) block copolymers and derivatives and mixtures thereof.

4. A vulcanizable rubber composition according to claim 1, wherein said at least one polymeric organic compound is an amorphous or semicrystalline polymer.

5. A vulcanizable rubber composition according to claim 1, wherein said at least one polymeric organic compound is substantially compatible with said polymeric base.

6. A vulcanizable rubber composition according to claim 1, wherein said cross-linkable unsaturated chain polymeric base is selected from the group consisting of natural rubber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylene-propylene-diene terpolymers, and derivatives and mixtures thereof.

7. A vulcanizable rubber composition according to claim 1, wherein said cross-linkable unsaturated chain polymeric base comprises from 20 to 100% by weight of a styrene-butadiene copolymer.

8. A vulcanizable rubber composition according to claim 1, further comprising at least a silica-based reinforcing filler.

9. A vulcanizable rubber composition according to claim 8, comprising from 10 to 80 parts by weight of said silica-based reinforcing filler per each 100 parts by weight of said polymeric base.

10. A vulcanizable rubber composition according to claim 8, wherein said silica-based reinforcing filler has a surface area of from 100 to 300 m²/g.

11. A vulcanizable rubber composition according to claim 8, further comprising at least a silane-based silica binding agent.

12. A vulcanizable rubber composition according to claim 1, wherein the composition has a hysteresis parameter having a first value in a temperature in the range from 40° C. to 70° C. and has a second value for the hysteresis parameter at a temperature above 70° C.

13. A vulcanizable rubber composition according to claim 12, wherein the composition has the second value at a temperature in the range of 100° C. to 130° C.

14. A vulcanizable rubber composition according to claim 1, wherein the hysteresis parameter in tanδ.

15. A tread for vehicle tires, obtained by forming and vulcanizing a rubber composition comprising:
   a. a cross-linkable unsaturated chain polymeric base, and
   b. at least one polymeric organic compound solid at room temperature and having a glass transition temperature of from 80 to 160° C. and an average molecular weight of from 10,000 to 1,000,000, said polymeric organic compound being substantially insoluble in said polymeric base,
   wherein said polymeric organic compound is present in an amount such that the vulcanized tread has a first hysteretic behavior at a first working temperature of a tire having the tread and a second hysteretic behavior, which differs from the first hysteretic behavior, at a second working temperature of the tire.

16. A tread according to claim 15, wherein said cross-linkable unsaturated chain polymeric base is selected from the group consisting of natural rubber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylene-propylene-diene terpolymers, and derivatives and mixtures thereof.

17. A tread according to claim 15, wherein the organic compound is selected from the group consisting: polyphenylenether, polyethylene, polypropylene, polymethyl-methacrylate, polystyrene, polyvinylalcohol, ethylene/vinyl alcohol copolymers, acrylonitryle-butadiene-styrene (ABS) terpolymers, ethylene-methacrylic acid copolymers, styrene-isoprene (SIS), styrene-butadiene (SBS), styrene-ethylene/butylene-styrene (S-E/B-S), and styrene-ethylene/propylene(S-E/P) block copolymers, and derivatives and mixtures thereof.

18. A tread according to claim 15, wherein the rubber composition comprises from 2 to 30 parts by weight per 100 parts by weight of the polymeric base of said at least one polymeric organic compound.

19. T tread according to claim 15, wherein said at least one polymeric organic compound is an amorphous or semi-crystalline polymer.

20. A tread according to claim 15, having an abradability value, measured according to DIN 53516, not greater than 120% of the abradability value of a tread of the same composition without said at least one polymeric organic compound.

21. A tread according to claim 15, wherein said cross-linkable unsaturated chain polymeric base comprises from 20 to 100% by weight of a styrene-butadiene copolymer.

22. A tread according to claim 15, comprising a silica-based reinforcing filler.

23. A tread according to claim 22, comprising from 10 to 80 parts by weight of silica-based reinforcing filler per each 100 parts by weight of said polymeric base.

24. A tread according to claim 22, wherein said silica-based reinforcing filler has a surface area of from 100 to 300 m$^2$/g.

25. A tread according to claim 22, wherein the rubber composition further comprises at least a silane-based silica binding agent.

26. A tread according to claim 22, having an abradability value, measured according to DIN 53516, not greater than 120% of the abradability value of a tread having the same composition without said polymeric organic compound.

27. A tread according to claim 15, wherein the curve of tangδ as a function of temperature for said vulcanized rubber composition has a peak at the glass transition temperature of said polymeric base and also at the glass transition temperature of said polymeric organic compound, such that said tread has a first hysteretic behavior at a first working temperature of said tread and a second hysteretic behavior, which differs from the first hysteretic behavior, at a second working temperature of said tread.

28. A tread according to claim 15, further comprising:
   a. at least a reinforcing filler dispersed throughout a cross-linkable unsaturated chain polymeric base, said tread being circumferentially placed around a belt strip of te tire externally having a rolling surface apt to roll on the ground,
   b. an amount from 2 to 30 parts by weight per 100 parts by weight of said polymeric base of said polymeric organic compound,
   wherein said polymeric organic compound is selected from the group consisting of polyphenylenether, polyethylene, polypropylene, polymethyl-methacrylate, polystyrene, polyvinylalcohol, ethylene/vinyl alcohol copolymers, acrylonitryle-butadiene-styrene (ABS) terpolymers, ethylene-methacrylic acid copolymers, styrene-isoprene (SIS), styrene-butadiene (SBS), styrene-ethylene/butylene-styrene(S-E/B-S), and styrene-ethylene/propylene(S-E/P) block copolymers and derivatives and mixtures thereof, and
   wherein the curve of tangδ as a function of temperature for said vulcanized rubber composition has a peak at the glass transition temperature of said polymeric base and also at the glass transition temperature of said polymeric organic compound, such that said tread has a first hysteretic behavior at a first working temperature of said tread and a second hysteretic behavior, which differs from the first hysteretic behavior, at a second working temperature of said tread.

29. A process for manufacturing a tire for vehicle wheels comprising the steps of:
   circumferentially providing around a carcass a tread, externally provided with a rolling surface, and
   linking by vulcanizing said carcass to said tread,
   wherein said tread is obtained by forming and vulcanizing a rubber composition comprising a cross-linkable unsaturated chain polymeric base and at least one polymeric organic compound, solid at room temperature, substantially insoluble in said polymeric base and having a glass transition temperature of from 80 to 160° C., said polymeric organic compound having an average molecular weight of from 10,000 to 1,000,000 and being present in an amount such that the vulcanized tread has a first hysteretic behavior at a first working temperature of the tire and a second hysteretic behavior, which different from the first hysteretic behavior, at a second working temperature of the tire.

30. A process to control the road behavior of tires, said tires being provided with at least a carcass ply anchored at opposite edges to a couple of bead wires, incorporated each in corresponding beads defined along internal circumferential edges of said tires, with at least a belt strip extending circumferentially around said carcass ply and having a tread circumferentially placed around said belt strip, externally having a rolling surface suitable to roll on the ground, comprising:
   obtaining said tread by forming and vulcanizing a rubber composition comprising a cross-linkable unsaturated chain polymeric base and at least one polymeric organic compound, solid at room temperature, substantially insoluble in said polymeric base and having a glass transition temperature of from 80 to 160° C., said polymeric organic compound having an average molecular weight of from 10,000 to 1,000,000 and being present in an amount such that the vulcanized tread has a first hysteretic behavior at a first working temperature of the tire and a second hysteretic behavior, which differs from the first behavior, at a second working temperature of the tire.

31. A vulcanizable composition according to claim 1, wherein the curve of tangδ as a function of temperature for said rubber composition has a peak at the glass transition temperature of said polymeric base and also at the glass transition temperature of said polymeric organic compound, such that said tread has first hysteretic behavior at a first working temperature of said tread and a second hysteretic behavior, which differs from the first hysteretic behavior, at a second working temperature of said tread.

* * * * *